March 15, 1960
G. G. ENSIGN ET AL
2,928,892
STACKED CELL ASSEMBLY
Filed Nov. 23, 1956
3 Sheets-Sheet 1
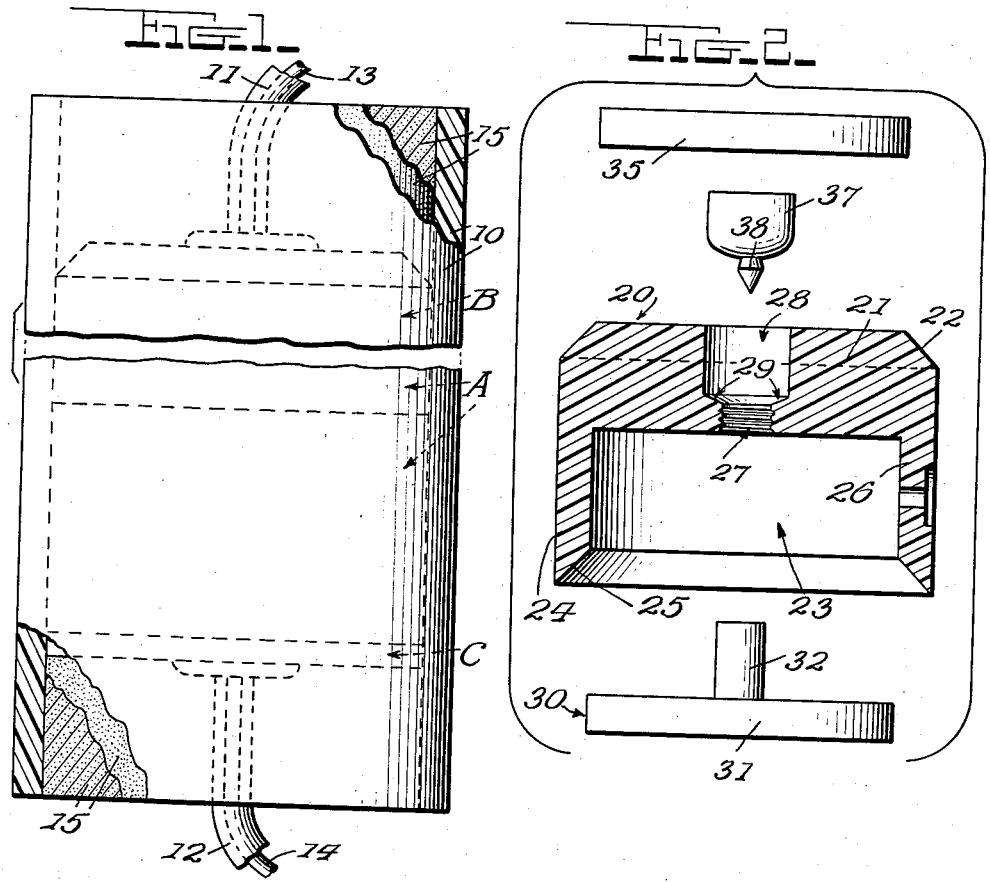
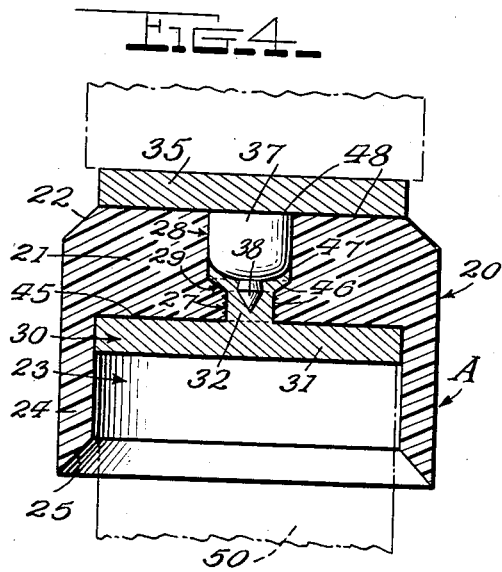
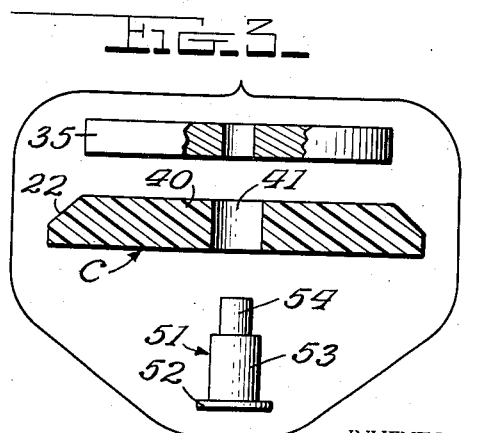
INVENTORS
G. G. Ensign and
T. L. Boswell
BY Mason, Porter, Diller & Stewart,
ATTORNEYS March 15, 1960  G. G. ENSIGN ET AL  2,928,892
STACKED CELL ASSEMBLY
Filed Nov. 23, 1956
3 Sheets-Sheet 2
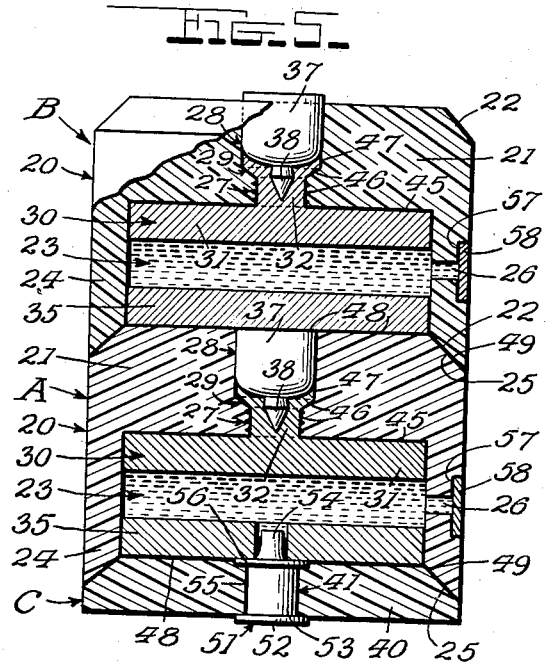
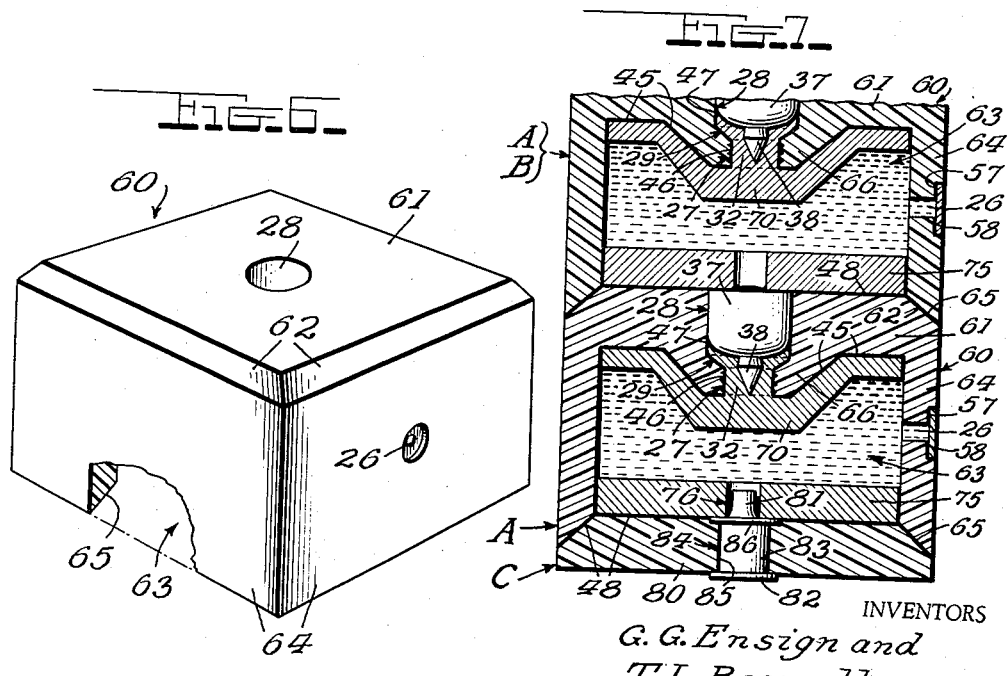
INVENTORS
G. G. Ensign and
T. L. Boswell
BY Mason, Porter, Diller + Stewart,
ATTORNEYS

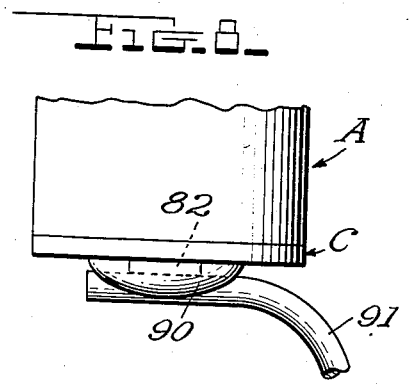
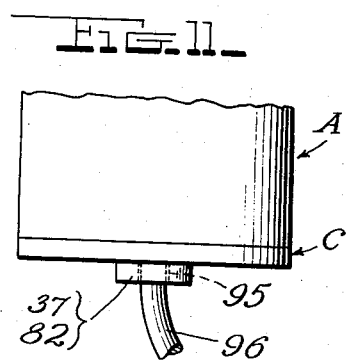
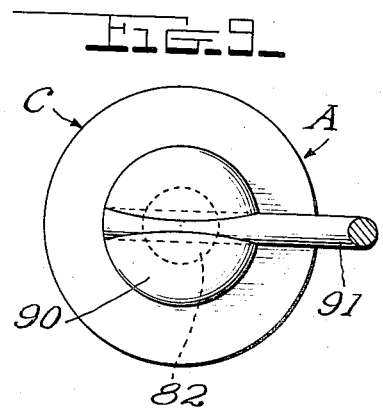
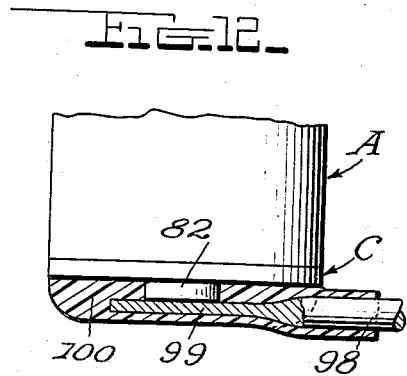
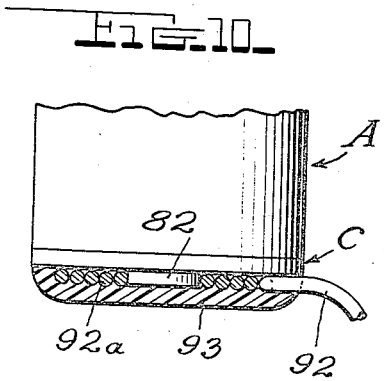
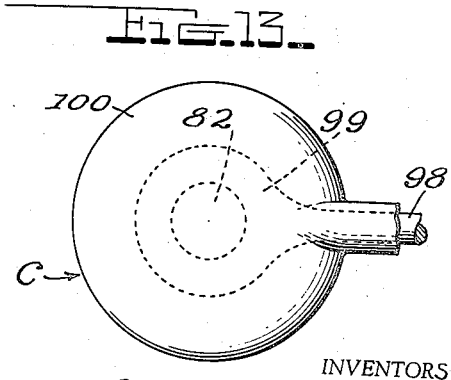
INVENTORS
G. G. Ensign and
T. L. Boswell

United States Patent Office 2,928,892
Patented Mar. 15, 1960

2,928,892

STACKED CELL ASSEMBLY

George G. Ensign and Thomas L. Boswell, Elgin, Ill., assignors to Elgin National Watch Company, Elgin, Ill., a corporation of Illinois Application November 23, 1956, Serial No. 623,926

3 Claims. (Cl. 136—111)

This invention relates to electrical energy producing cells constructed and arranged for stacking or grouping in sets of low volume and weight for the wattage available.

An object of the invention is the provision of cell structures for multiple or stacked assemblies, in which a single wall thickness is employed for supporting at one side thereof an anode and at the other side thereof a cathode, and in which the wall contains an anode extension and a terminal member electrically connected together and with the terminal member electrically and mechanically connected to the cathode.

Another object of the invention is the provision of unit cell structures each including electrodes, and a housing, which can be connected in sets and filled with electrolyte to provide assemblies of a predetermined terminal voltage.

Another object is the provision of cell structures for stacking assemblies in which a casing supports the electrodes and a lead-out connector for the electrodes, and in which a sealing layer of conductive material is employed as part of the lead-out connector.

A further object is the provision of cell structures for stacking assemblies, in which a casing of insulating material supports an anode, an anode terminal, and a cathode mass connected to the anode terminal; and in which a cement for sealing one cell is effective for joining it to a second cell in series therewith.

A further object is the provision of cell structures for stacking assemblies, in which the casings are of insulating material and shaped for stacking or nesting together, with each casing containing electrodes and electrolyte, and including terminals at the ends of each cell whereby upon stacking the cells are connected in series, together with a sealing cement of conductive material for mechanically and electrically joining electrode structures of adjacent cells in the stack.

A further object in a method of making cell assemblies, in which a unit casing is provided with electrodes at opposite faces of a wall thereof, and in which the stacking of the unit casings with a connecting cement therebetween also effects sealing of the casing cavities for receiving the electrolyte.

A further object is the provision of a casing unit construction which permits employment of desired external shapes of nested assemblies, such as cylindrical, square, rectangular, hexagonal, etc., for reception in predetermined spaces in compact equipment.

An illustrative form of the cell assemblies is shown in the accompanying drawing, in which:

Fig. 1 is an elevation of a stacked assembly with terminal conductors and an external insulating sleeve;

Fig. 2 is a composite view showing the parts employed for an intermediate unit structure, with the unit casing in section;

Fig. 3 is a composite view including a sectional view of an end closing element;

Fig. 4 is a sectional view of an intermediate casing unit assembly;

Fig. 5 is a sectional view of two stacked and connected units;

Fig. 6 is a perspective view of a unit casing of rectangular shape;

Fig. 7 is an axial sectional view of part of a battery assembly employing unit casings as in Fig. 6;

Figs. 8 and 9 are respectively side and end views of a modified terminal construction;

Figs. 10 and 11 are views, partly in section, of further modified terminal constructions;

Figs. 12 and 13 are respectively a side view, partly in section, and an end view, of another terminal construction.

This invention is particularly appropriate for the construction of small batteries of specified terminal voltage and having a low specified amperage and coulomb output; but is not limited thereto.

As shown in Fig. 1, a stacked assembly can be formed of a desired number of intermediate casing units A, an anode terminal casing unit B, and a cathode terminal piece C. These are shown as located in an external jacket 10 of insulating material such as polyvinyl compounds, polystyrene, glass, or the like, which may be transparent to permit viewing the condition of the stacked cells. Small flexible tubes or spaghetti 11, 12 are present around the flexible terminal conductors 13, 14, and fillings 15 of a hardened resin serve to seal the tubing 10 and support the spaghetti and conductors against strain. The assembly is thus protected against conductive contact with nearby metal when employed in electrical equipment where space is restricted.

The parts for a pre-assembly unit are shown in Fig. 2, in which the main casing 20 can be employed for the units A or B in Fig. 1. This casing 20 has a thickened end 21 with an external beveled edge 22, and a central cavity 23 within the skirt wall 24 which has a beveled edge 25 for mating the edge 22 of the casing of another unit. The skirt wall 24 has an aperture 26 through which electrolyte can be introduced into the cavity 23. This casing 20 may be of a desired cross-section, illustratively circular. The thick end wall 21 has an aperture, concentric in the illustration, provided by the smaller inner bore 27 and the larger bore 28, the bores being joined by a sloping shoulder 29. The inner bore 27 may have fine peripheral grooves.

The anode 30 comprises a circular disk 31 in the illustrated form, of a diameter to closely fit the cavity 23, and a mass and thickness determined stoichiometrically to yield the coulomb output specified. It has a coaxial integral extension 32 which fits the bore 27 and is of a length to project therethrough. It is made of a suitable electrochemically active material such as indium.

The cathode 35 is in the illustrative form a circular disk, and may be made of a suitable electrochemically active material such as a mixture of mercuric oxide, silver and graphite powder, and a bonding plastic, as set out in the copending application Ser. No. 297,011 filed July 3, 1952, now Patent No. 2,772,321. Its diameter permits it to enter the cavity 23 of another casing unit and closely fit therein; and its mass and thickness is stoichiometrically determined to correspond to the electrochemical value of the anode.

The anode terminal 37 is provided by a silver element having a periphery closely fitting the larger bore 28, and having a rounded bottom provided with a coaxial spear-like point 38.

The cathode and element C of the illustrated form, Fig. 3, comprises a closing member 40 which has a size and shape identical with the exterior of the casing 20, and also has an external beveled edge 22. The member 40 has a concentric central bore 41 for receiving a conductive external terminal piece.

The unit casings 20 and cathode pieces 40 are preferably molded of a plastic inert to the electrolyte, such as polyvinyl formal for the illustrated form of practice.

In assembling a casing unit A or B, a sealing cement is applied to the inner end wall surface of the cavity 23 and in the bores 27, 28. The preferred cement, as set out below, is fluid by reason of its content of volatile solvent: and the cement is permitted to dry, so that a part of the solvent escapes and the coating film becomes stiffly viscous and provides a continuous coating with the film portion 45 on the lower or internal surface of the casing end 21, the film portion 46 lining the smaller bore 27 and the shoulder 29, and the film portion 47 lining the larger bore 28. The anode 30 is then introduced into the cavity, so that its extension 32 projects into the larger bore 28; noting this extension 32 may displace part of the film 46 as it is forced in. This extension 32 is then spread and flattened while the body 31 is being pressed firmly against the film 45 of sealing cement, wherewith the end of the extension essentially fills the lined bore 27 and bears against the lined shoulder 29, with the cement films 45, 46, 47 located between the anode material and the casing walls throughout their proximate areas. The anode terminal element 37 is then forced into the larger bore 28, so that its point 38 penetrates into the flattened anode extension and the bottom engages and causes cold flow of the anode material into the space between the element 37 and the cement film 47 on the bore wall, filling this space and forming a feather edge at the upper limit of its travel. This flow of the anode material also causes it to engage the surfaces of spearpoint 38 and mechanically join the element 37 and anode 30. Some of the viscous cement film 47 may be extruded, during this terminal forming operation, around the upper edge of the element, and is wiped away after the terminal element 37 has been seated. The body 31 of the anode is supported by an appropriate anvil or bucking block 50 (Fig. 4) during the flattening or upsetting of the anode extension and the seating of the element 37.

For an intermediate casing unit A, a film 48 of conductive cement is now applied over the circular area at the outer face of the casing 20 and over the element 37; that is, the area bounded by the beveled surface 22. A cathode 35 is applied coaxially over this cement film 48, and the parts are held in position until coherent. Such a cathode is not applied to a terminal casing unit B: and it is preferred to employ a longer element 37 so that it projects externally.

The end member 40 for the closing cover C receives a silver plug 51. In the illustrated form, this plug 51 (Fig. 3) is made as a rivet with an enlarged head 52 to engage the outer face of the member 40, and its stem 53 closely fits the bore 41 and is longer than the bore: a reduced projecting end 54 serves later for assuring electrical conduction. After coating the bore wall with sealing cement as used for the films 45, 46, 47 and drying to thickly viscous condition as a film 55, the stem 53 is introduced, and its upper end is flattened and expanded so that a second head 56 is formed. The plug 51 is thus held mechanically in place by the heads 52, 56, and escape of electrolyte is prevented by the cement film 55. A conductive cement film 48 is then applied over the surface bounded by the bevel 22 and over the rivet head 56 and the projecting pin end 54: and a cathode 35 is placed coaxially thereover, noting that this cathode for the unit C is provided with a central aperture for receiving the coated pin end. When the cathodes 35 are used without apertures, the pin end 54 is also omitted; and the conductive cement film 48 is applied over the flattened head 56 and the general top area of the member 40 within the bevel 22. As the cathode is forced into position, it engages the film 48 and is bonded in place thereby, with parts of the conductive cement bonding and electrically joining the pin end 54 to the cathode mass.

In the assembly by stacking or nesting the units, Fig. 5, an anode end unit B and a cathode end piece 40 are employed, with a number of intermediate units A so that the proper terminal voltage will be produced. Films 49 of insulating and sealing cement are then applied to the beveled edges 22, 25, and partially dried: the successive parts are brought together, with the surface 22 of a first casing unit A nesting with and being sealed to the surface 25 of the casing unit B, the surface 22 of a second casing unit A likewise nesting and sealed with the surface 25 of the first unit A, etc.; and finally the last unit A is nested and sealed with the surface 22 of the cover unit C at the cathode end. The parts are held until the cement secures and fixedly seals the parts together. Excess of cement for films 49 is largely extruded at the exterior and can be wiped away: a small quantity enters each adjacent cavity 23, passing into any space between the associated cathode 35 and the inner wall of the skirt.

A hypodermic needle can be inserted into the hole 26 of a cell, and the hypodermic employed to inject an electrolyte, which can be a strong potassium hydroxide solution in the illustrative form, as taught in U.S. Patent 2,683,184 to Boswell and in the aforesaid application Ser. No. 297,011. It is preferred to evacuate the cell cavity, to promote the entry of the electrolyte into the space between the respective anode 30 and cathode 35 of the cell. This evacuation procedure also permits employment of smaller holes 26 with the accompanying greater casing strength; and the removal of air or gas from pores in the cathode mass and other crevices, so that a complete filling with a predetermined quantity of electrolyte is feasible. Further, when it is desired to employ a gelling or thickening agent, such as the sodium salt of carboxymethyl cellulose, in the electrolyte, such may be added as powder or a tablet by introduction into the spaces 23 before stacking assembly of the units: thus the electrolyte solution itself is fluid and can be injected at room temperature, to fill the cell spaces and enter the cathode mass as such, and then by simple standing at room temperature the thickener dissolves into and effects gelling of the electrolyte in the spaces between the electrodes. This injection of electrolyte can be done, for example, by a chamber receiving the stacked assembly or sealed thereto around the injection hole or holes, and with the needle extending through the chamber wall and into a hole: reduction of pressure in the chamber causes removal of the air and flow of the electrolyte for complete filling. When the cells have been filled, layers 57 of electrolyte-resistant cement are applied around the holes 26, and they are closed by patches 58 of the casing plastic.

The nested assembly can then be provided with end members as shown in Fig. 1. For example, lengths of wire for conductors 13, 14 can have ends coiled as plane spirals with a central space for fitting the projecting parts of the end conductive element 37 and the rivet head 52. These spirals are then dipped into the conductive cement, and are placed around the parts 37, 52, and held until the cement has set sufficiently to position the members fixedly and then permitted to set until essentially all of the solvent has evaporated. If air drying is used, several hours will be required but the drying process may be done more rapidly by raising the temperature to say 150° F. for the materials being used. Care should be taken not to eliminate the solvent so rapidly as to cause fissures to be formed in the cement coating. This electrical connection can then be protected against mechanical rupture by pulls on the conductors, by applying temporary collars of pressure sensitive tape which project beyond the assembly ends to provide dams: the spaghetti tubes 11, 12 are applied; and a casting resin is placed within the dams, thus bonding to the plastic of the end units, to the conductive films over the conductor wires and terminals, and to the spaghetti. Upon setting of the casting resin, the temporary collars can be stripped off and the resin masses trimmed to specified over-all length. The external jacket 10 can be applied either as a tape of insulating material or as a sleeve. Obviously, the jacket 10 can be applied to the assembly, and itself employed as the mold or dam for the casting resin. A suitable material for such end masses 15 is a potting or casting type of resin which is adherent to both metal (e.g. the silver terminals and copper conductor wire) and to the casing plastic and spaghetti: epoxy type compounds with amine accelerator have such properties and strengthen the terminal structure mechanically and prevent large stresses upon the interfaces between the conductor parts and the conductive films: the commercial material known under the trademark P–420 has been found satisfactory.

Other shapes and forms may be employed, determined by the coulomb, voltage and amperage specifications, the size and shape of the space to be occupied, the types of electrical connections and mechanical protection, and the other incidents for employment.

In the construction shown in Figs. 6 and 7, the cell unit 60 is of square form in transverse section, with the top wall 61 having beveled edges 62, and the cavity 63 defined by the skirt walls 64 of uniform thickness and provided at their edges with the mating beveled surfaces 65. A hole 26 is provided for filling. The top wall 61 has an aperture with the smaller and larger bores 27, 28 as before, with the sloping shoulder 29. In this form, the end wall 61 has a boss or thickened portion 66, and the anode 70 is conformed to this boss, preferably with thickness greater (e.g. 1½ to 2 times) over the boss as compared with the periphery at the skirt walls 64, so that it will be regularly and totally consumed during cell action: the anode periphery closely fits the skirt walls 64 of the cavity 63. The integral projection 32 of this anode 70 can be shaped and joined to the terminal 37 as set out above, after application of the sealing films 45, 46, 47. The outer surface of the top wall 61 is coated with a conductive cement film 48 and the square cathode 75 seated thereon. The assembly of an anode terminal unit B with a desired number of intermediate units A is accomplished as before. When the cells of Figs. 6 and 7 are made of larger capacity than the illustrative small cells of Figs. 1–5, it is preferred to form at least the last cathode 75 with an aperture 76. The closing casing member 80 at the cathode end is of perimeter which in size and shape matches those of the casing skirts 64, and has a mating beveled edge 62. The cathode terminal is formed as before of a silver element having an end 81 in the cathode aperture 76, a head flange 82 engaged with the outer surface of the end member 80, and a stem 83 closely fitting the hole 84 in the member 80 and projecting therebeyond as a second head 86. In sub-assembly of the closing member 80, sealing cement such as that for the films 45, 46, 47 is applied in the hole 84, to provide a film 85 and the cathode terminal element forced in from the lower surface until its head 82 is firmly seated against the member 80; the head 82 is then supported on an anvil block, and parts of the inwardly projecting stem 83 are then upset to provide the expanded head 86 whereby the heads 82 and 86 assure a secure mechanical mounting in the member 80. Any extruded parts of the cement film 85 are wiped off. The film 48 of conductive cement is applied over the non-beveled part of the top surface and over the end 81 and head 86 of the cathode terminal pin: the cathode 75 is then applied, whereby the films 48, 85 assure against leakage around the silver element, together with bonded support of the cathode 75 and electrical conductivity between the cathode and the silver elements 81, 86, 83, 82.

After completion of assembly of the units and cathode end piece, and setting of the cement, the cells can be filled with electrolyte as before: and provided with conductors and packets if desired.

The smaller bores 27 may be provided with depressions for detaining parts of the cement films: use of a fine-pitch tap has been found to give excellent results. In practice, the original diameters of the bore 27 may closely correspond to the diameters of the anode extensions, taking into account the cement film thicknesses; and with the taps sized to cut grooves of widths about equal to the lands beween them.

With cells which are held by apparatus spring clips, these can be engaged with the anode and cathode terminals. Pigtail constructions as in Fig. 1 can be employed. Other forms are shown in Figs. 8 to 13.

In Figs. 8 and 9, the terminal (illustratively a terminal head 82) receives a deposit 90 of conductive cement which extends over adjacent parts of the cathode end piece. A conductor 91 is pressed into the mass of viscous cement and held in position until the cement has set.

In Fig. 10, a conductor 92 has its end curled into a flat spiral 92a with a central aperture closely fitting a projecting terminal piece 82, and is slipped thereover after an application of conductive cement. Further cement is then placed over the spiral, to provide a flat bead 93: union of the cement applications and their adhesion to the cell casing, the terminal, and the conductor assure a solid mechanical and electrical junction.

In Fig. 11, the projecting terminal element, illustratively 37 or 82 may have a hole 95 therein, and a conductor wire 96 is pressed into this hole, after conductive cement has been applied to the parts.

In Figs. 12 and 13, a conductor 98 has a flattened and widened end 99. Conductive cement 100 is applied over the end of the assembled battery, and the conductor end 99 pressed into place and held until the cement sets.

The epoxy type resin used for the masses 15 can be employed as coverings for the terminal parts in Figs. 8–13, as described for Fig. 1, or as thin coating masses.

These various terminal structures can be employed at either or both the anode and cathode ends of the battery.

The sealing cement for the films 45, 46, 47, 85, is prepared for resistance to the action of the electrolyte, and for maintaining the seal without mechanical separation and without seepage between the sealing film and the surfaces being sealed. A satisfactory cement for alkaline batteries has been made with one part by weight of the Butyl rubber commercially obtainable and known as GR–I–25 (Reconstruction Finance Corporation specification), four parts by weight of polyethylene, and one part by weight of polybutene. These solid ingredients are mixed on a rubber mill, and the resulting mixture is dissolved in trichlorethylene. The polyethylene known as Type DXL–2, and the polybutene known as Type H–35 Indopol, have been found satisfactory.

The cement for the films 49 and for securing the closing patch or wafer over a filling hole 26 can be a solution of about 10 percent by weight of polyvinyl formal in ethylene dichloride.

A suitable conductive cement for the films 48, 90, 93, 100 which hold the cathodes in place and assure electrical connection to conductors is made by dissolving polyvinyl formal as a solution of about 10 percent by weight in ethylene dichloride, trichlorethylene, or a mixture thereof. Precipitated silver powder is then added gradually with stirring until 95 parts by weight have been added for every five parts by dry weight of the polyvinyl formal. The amount of solvent originally used, or employed for dilution, determined the consistency of the pasty mass. The amount of solvent employed in the thin cement films for bonding a cathode 35 to a casing unit 20 for example, may be greater than in the thicker cement body introduced for filling the cathode apertures around the silver pins 54, 81: thus, with lesser solvent in these larger masses, the formation of crevices due to the drying of the solvent can be avoided, with the possibility of increased electrical resistance due to such crevices: noting that a greater amount of solvent is preferably employed in the cement coating for joining the cathodes to casing units in pre-assemblies for assuring the bonding action at both surfaces, and that the maintenance of pressure on the pre-assemblies during the elimination of the solvent can effect a follow-up action until the residual amount of solvent has been reduced to a proportion at which no significant further decrease in volume occurs during completion of the elimination. This forms a semi-viscous mass which can be applied by a brush or stick, and adheres to the cell casing and to the cathode for example; and has almost inseparable adhesion when the casing is of polyvinyl formal, and the cathode mass contains the same plastic as a binder. The sub-assembly is then thoroughly dried, with heating to 150 degrees F. being permissible, before final assembly is begun. These conductive films make electrical connection during the sub-assembly between the anode and cathode thereof, so that they are united by a low-resistance joint in the completed battery; they likewise serve for holding the cathodes in place in the sub-assemblies and in the completed battery; and they provide large area collectors to reduce the internal electrical resistance of the battery.

It is obvious that the illustrative embodiments are not restrictive, and that the invention can be practiced in many ways within the scope of the appended claims.

We claim:

1. A stacked electrical cell assembly comprising a plurality of casing units of electrically insulating material; each casing unit having an end wall and a skirt wall integrally joined and providing an open-ended cavity, said end wall having an aperture therethrough, electrodes consisting of a cathode fixed on one surface of the end wall and an anode fixed on the other surface of the end wall, one said electrode being located in the cavity with the skirt wall extending beyond the said one electrode for providing an electrolyte space between said one electrode and the electrode fixed to the outer surface of the end wall of the adjacent casing unit, an electrical connection between said anode and cathode located in said aperture, and a sealing cement in said aperture for preventing leakage therethrough; the edge of the skirt wall of one unit being fitted to the edge of the end wall of the said adjacent unit outside the area of said adjacent unit which is occupied by the electrode fixed to the outer surface thereof, and an electrolyte-impermeable cement film joining said edges.

2. A casing unit for an electrical cell structure having an end wall with an external peripheral bevel extending from a central area of the end wall to the periphery of the structure, and a skirt wall integral with the end wall and providing an open-ended cavity, said skirt wall having a mating bevel at its edge, said walls being of electrically insulating material, said end wall having an aperture opening at said central area, a cathode secured to the external surface of the end wall on the said central area thereof, an anode located in said cavity and secured to the surface of the end wall, an extension from the anode projecting into the aperture, an electrical connection member located in the aperture at the end thereof adjacent said central area and in conductive relation to said cathode, said anode extension and connection member each terminating within the aperture and having an electrically conductive connection with one another located wholly within the aperture, and sealing means effective for preventing passage of electrolyte into said aperture and to said conductive connection.

3. A casing unit structure for an electrical cell assembly comprising a unitary structure of electrically insulating material having a closing end wall with an aperture therethrough, a peripheral skirt wall integral with and extending from the end wall to provide an open-ended cavity, the periphery of the outer face of said end wall and the edge of the skirt wall having mating bevels, an anode located in and partly filling the said cavity and extending over said aperture and having an extension into said aperture, a cathode on said outer face of the end wall over said aperture, an electrical connection from the cathode to the said anode extension and located within the aperture, and electrolyte impermeable cement fixing the anode and cathode to said end wall and sealing said aperture against penetration of electrolyte thereto, the residual space in said cavity within the space providing an electrolyte chamber between the anode and the inner edge of the said skirt bevel.

References Cited in the file of this patent

UNITED STATES PATENTS

| | | |
|---|---|---|
| 2,178,969 | Ruben | Nov. 7, 1939 |
| 2,307,770 | Diebel | Jan. 12, 1943 |
| 2,650,945 | Herbert | Sept. 1, 1953 |
| 2,654,794 | Zaugg | Oct. 6, 1953 |
| 2,677,716 | MacFarland | May 4, 1954 |
| 2,692,906 | Morgan | Oct. 26, 1954 |
| 2,762,858 | Wood | Sept. 11, 1956 |
| 2,862,039 | Ensign et al. | Nov. 25, 1958 |